United States Patent [19]
D'Souza et al.

[11] Patent Number: 5,717,902
[45] Date of Patent: *Feb. 10, 1998

[54] METHOD AND SYSTEM FOR SELECTIVELY APPLYING AN APPROPRIATE OBJECT OWNERSHIP MODEL

[75] Inventors: David J. D'Souza, Kirkland; Kenneth Walter Sykes, Redmond, both of Wash.

[73] Assignee: Microsoft Corporation, Redmond, Wash.

[**] Term: 14 Years The term of this patent shall not extend beyond the expiration date of Pat. No. 5,432,934.

[21] Appl. No.: 368,666

[22] Filed: Jan. 5, 1995

Related U.S. Application Data

[62] Division of Ser. No. 168,633, Dec. 15, 1993, Pat. No. 5,432,924.

[51] Int. Cl.$^6$ .................. G06F 9/00; G06F 9/44
[52] U.S. Cl. .................. 395/500; 395/572; 395/601; 395/604; 395/612; 395/614; 395/615; 395/705; 364/281.3; 364/282.1; 364/282.2; 364/DIG. 1
[58] Field of Search .................. 395/500, 572, 395/601, 604, 612, 614, 615, 570, 705; 364/DIG. 1, 280, 281.3, 282.1, 282.2, 286

[56] References Cited

U.S. PATENT DOCUMENTS

| 5,075,845 | 12/1991 | Lai et al. | 395/425 |
|---|---|---|---|
| 5,136,712 | 8/1992 | Perazzoli, Jr. et al. | 395/700 |
| 5,187,790 | 2/1993 | East et al. | 395/725 |
| 5,210,872 | 5/1993 | Ferguson et al. | 395/650 |
| 5,230,065 | 7/1993 | Curley et al. | 395/200 |
| 5,379,432 | 1/1995 | Orton et al. | 395/700 |
| 5,423,023 | 6/1995 | Batch et al. | 395/500 |
| 5,430,878 | 7/1995 | Straub et al. | 395/700 |
| 5,432,924 | 7/1995 | D'Souza et al. | 395/500 |
| 5,483,647 | 1/1996 | Yu et al. | 395/500 |

OTHER PUBLICATIONS

Leighton, Tom et al., "Efficient Algorithms for Dynamic Allocation of Distributed Memory," IEEE Publication, 1991, pp. 470–479.

Burk, Ron et al., "A reusable C++ chunk allocator for DOS and Windows," Journal Paper, Feb., 1992, v3 n2, p. 5(9).

Custer, Helen, "A grand tour of Windows NT:portable 32–bit multiprocessing comes to Windows," Microsoft Systems Journal, Jul.–Aug. 1992, v7 n4, p. 17(15).

Heale et al., "The Design of a Universal Clan Store," IEEE, 1993, pp. 218–221.

Dean et al., "Vista: A Microstorage Architecture That Implements File Systems and Object Database", IEEE, 1993, pp. 194–198.

Gingiser et al., "Object based Semantic Real–time Concurrency Control", IEEE, 1993, 87–96.

*Primary Examiner*—Kevin J. Teska
*Assistant Examiner*—Thai Phan
*Attorney, Agent, or Firm*—Seed and Berry LLP

[57] ABSTRACT

A method and system for applying an appropriate object ownership model is provided. In a preferred embodiment, an operating system selectively applies an object ownership model with which running programs are compatible. This permits programs designed to be used with operating systems that do not apply a rigorous object ownership model to be used with an operating system capable of applying a rigorous object ownership model. The method and system has both an automatic object deallocation phase and an object access control phase. In the automatic deallocation control phase, the method and system defers the automatic deallocation of objects owned by programs that are incompatible with automatic object deallocation until a later time at which no such programs are still running. Instead of immediately deallocating the objects owned by a terminating program, the method and system designates them for deferred deallocation. At a later time, the method and system checks to see whether any programs that are incompatible with automatic object deallocation are still running, and, if none are, the method and system deallocates all objects designated for deferred deallocation. In the object access control phase, the method and system allows special permissive access to objects owned by programs that are unable to authorize access to the object by other programs. Instead of denying access by a requesting program to an object owned by a program that is unable to authorize access to the object by other programs because it has not authorized any other programs to access the object, the method and system allows the requesting program to access the object.

12 Claims, 15 Drawing Sheets

METHOD AND SYSTEM FOR SELECTIVELY APPLYING AN APPROPRIATE OBJECT OWNERSHIP MODEL

CROSS-REFERENCE TO RELATED APPLICATION

This application is a division of U.S. patent application Ser. No. 08/168,633, filed Dec. 15, 1993, which is now U.S. Pat. No. 5,432,924.

TECHNICAL FIELD

The invention relates generally to a method and system for ensuring the compatibility, of an operating system with other computer programs, and, more specifically, to a method and system for ensuring the compatibility of an operating system having a first object ownership model with other programs having been developed for an operating system having a second, less rigorous object ownership model.

BACKGROUND OF THE INVENTION

Many operating systems permit programs to allocate objects for their use. While many different definitions for objects exist, the set of objects discussed herein is relatively inclusive. An object as discussed herein is one of several standard data structures, each for storing data about a particular aspect of a program, such as a picture, also known as a bitmap, or a menu. An object may also contain methods, which are programs for interacting with the data contained in the object. When an object is allocated, a block of memory is reserved to hold the contents of the object. In many operating systems, objects are stored in linked lists, such that either all of the objects of a given type are in the same list or all of the objects "owned" (ownership is described in more detail below) by a particular program are in the same list.

In order to ensure a certain level of reliability, many operating systems implement a system of object ownership. In such a system, the operating system attributes ownership of each object of some, if not all, types to a particular program. A system of object ownership prevents the unnecessary use of some memory resources by permitting the operating system to automatically deallocate an object when the program to which its ownership is attributed terminates. Likewise, a system of object ownership enables the operating system to prevent unauthorized access to an object by identifying, for each object, a program that is permitted to specify which other programs are authorized to access the object.

The level of control that programs are able to exercise over objects when used with a particular operating system depends on the particular object ownership model supported by the operating system. In an operating system that supports laissez faire object ownership models, objects are not owned by any program. An object may therefore be accessed (i.e., read from, written to, or, in the case of an object having methods, invoked) or deallocated by any program that is aware of the object's existence. FIG. 1 is a block diagram of an object as defined in an operating system that supports the laissez faire object ownership model. The diagram shows a laissez faire object 100, the sole contents of which are object data 101. In the case of a bitmap object, the object data 101 corresponds to the color value for each of a number of adjacent pixels. The laissez faire object does not contain any indication of the identity of the program that allocated the object, the programs that may attempt to use the object, the programs that may attempt to deallocate the object, or the program that might be said to be the object's owner. To the contrary, the object has no owner.

In operating systems that support the laissez faire object ownership model, programs are able to informally share an object. Two programs informally share an object when they share the object by consensus and without the knowledge of the operating system. Generally, this process involves a program that wishes to share an allocated object sending a message to that effect to the program that allocated the object. The program that allocated the object responds by providing a way for the sharing program to access the object, such as a pointer or a handle.

FIG. 2 is a timing diagram showing the informal sharing of a laissez faire object. Here, the object is a bitmap object that contains a visual image of a toolbar that is allocated by a spreadsheet program and shared by the spreadsheet program and a word processing program. The timing diagram shows a time scale 200 having the following time graduations: time $t_1$, time $t_2$, time $t_3$, time $t_4$, and time $t_5$. The timing diagram also shows a spreadsheet program running interval 210 during which the spreadsheet program is running, a word processing program running interval 230 during which the word processing program is running, and a bitmap object allocated interval 220 during which the toolbar bitmap object is allocated.

A spreadsheet program launch node 211 shows that the spreadsheet program is launched at time $t_1$. The launch starts the spreadsheet program running interval 210. Together a causation arrow 212 and an object allocation node 221 show the the spreadsheet program allocates the bitmap object at time $t_2$. The spreadsheet program uses the bitmap object during object use range 222, from time $t_2$ until the spreadsheet program terminates at time $t_4$. A word processing program launch node 231 shows that the word processing program is launched at time $t_3$. The launch starts the word processing program running interval 230. An object use range 223 shows that the word processing program begins using the bitmap object at time $t_3$. Both objects continue to use, i.e., share, the bitmap object until time $t_4$. The spreadsheet program terminates at time $t_4$, as shown by a spreadsheet program termination node 213. Since the word processing program has not finished using the bitmap object, the spreadsheet program delegates responsibility for deallocating the bitmap object to the word processing program. This process involves the spreadsheet program sending a message to the word processing program indicating that the word processing program is now responsible for deallocating the bitmap object. The word processing program then continues to use the bitmap object, as shown by the object use range 223. A word processing program termination node 232 shows that the word processing program terminates at time $t_5$. Together a causation arrow 233 and an object deallocation node 224 show that, because no other program are using the bitmap object, the word processing program deallocates the bitmap object. After the word processing program deallocates the bitmap object at time $t_5$, the bitmap object no longer exists or consumes space in memory.

In operating systems that support more rigorous object ownership models, where the operating system assumes greater control over objects, objects are each owned by some program. FIG. 3 is a block diagram of an object as defined in an operating system that supports a more rigorous object ownership model. The diagram shows a rigorous object 300. The object 300 contains object data 301 and an owner field 302. The owner field 302 contains an indication of the program to which ownership or the object is attributed and is typically stored within the object, as shown. As an alternative to storing the owner field 302 with the object 300, the owner field may be stored together with the owner fields for other objects in a central location. Ownership of an object in most such operating systems is initially attributed to the program that allocated the object. Typically, ownership can later be transferred from the allocating program to another program.

Revising an existing operating system to expand the set of object types that are owned further increases the reliability of the operating system. For example, an operating system may be revised to make a new type of object owned. Revising an operating system to expand the ways in which the operating system exercises control over owned objects likewise further increases the reliability of the operating system. For example, an operating system may implement automatic deallocation of owned objects, or to control the set of users or programs that may access owned objects.

In order to reclaim space in memory occupied by objects that are no longer needed, an operating system may implement automatic deallocation of owned objects. In some cases, because of design or implementation flaws, the allocating program fails to provide code for deallocating the objects that it has allocated. In such cases, the allocating program fails to ever deallocate such objects. Because no other program is responsible for deallocating the object, the object survives forever (i.e., until the operating system is restarted or otherwise clears all of its working memory), occupying valuable memory space. Also, in some cases, the allocating program may terminate abnormally. For example, in many operating systems, when the operating system detects a severe error such as a general protection violation or a page fault during the execution of a program, it can terminate the program unilaterally. In such cases, the allocating program is terminated immediately without notice. Immediate termination prevents the allocating program from executing any code it has to deallocate the objects for which it has deallocation responsibility. In such cases of abnormal termination, the objects for which the allocating program has deallocation responsibility and which exist at the time of abnormal termination survive forever. An operating system that implements the automatic deallocation of objects overcomes these problems by immediately deallocating any objects owned by the terminated program. This usually involves traversing the linked lists that connect allocated objects, and deallocating any objects appearing in the linked lists whose owner field 302 indicates that it is owned by the terminated program.

In order to guarantee the security of data contained in objects, an operating system may control the set of users or programs that may access owned objects. Some computer systems use objects that contain sensitive information intended to be used for specific, limited purposes, but not otherwise made available to other programs or users. To this end, an operating system may be revised to control the set of users or programs that may access owned objects. FIG. 4 is a block diagram of an object as defined in an operating system that consols the set of users or programs that may access owned objects. The object 400 contains object data 401, an owner field 402, and a pointer to an access control list 403. The owner field 402 contains an indication of the program to which ownership of the object is attributed. The pointer to an access control list 403 points to an access control list 410. The access control list 410 contains a series of list entries, including list entries 411 and 412. Each list entry identifies a program that is authorized to access the object 400. In some operating systems, a list entry may designate a group of programs. Such a group may include the group of programs being executed for a particular user. Also, in some operating systems, a list entry may specify the particular type of access to be permitted by the designated programs, e.g., read, write, or invoke. In such an operating system, when a program attempts to access the object 400, the operating system examines the list entries in the access control list 410 to determine if the program is authorized to access the object 400. If the operating system locates a list entry authorizing the program to access the object 400, then the operating system provides the program with access to the object, else the operating system returns without providing access to the object.

Many operating systems implement automatic deallocation of owned objects or control the set of users or programs that may access owned objects, as this tends to make the object ownership model supported by an operating system more rigorous, and therefore the operating system more reliable. Because the purpose of making an operating system's object ownership model more rigorous is to give the operating system more control over objects, a more rigorous object ownership model necessarily leaves programs that are used with the operating system with less control over the objects with which they interact. Developers of programs that are developed for use with an operating system that supports a rigorous object ownership model are able to adapt the programs to require less control over the objects with which they interact. However, many programs that have already been developed for use with an operating system that supports a less rigorous object ownership model have and retain dependencies on the ability to exercise the level of control over objects that is possible in connection with the operating system that supports a less rigorous object ownership model. When these "old" programs developed for use with an operating system supporting a less rigorous object ownership model are used with a "new" operating system supporting a more rigorous object ownership model, these dependencies of the old program are consistently violated. This usually occurs in cases where old programs, presuming a higher level of control over objects than a new operating system permits, attempt to informally share an object.

FIG. 5 is a timing diagram that illustrates how a new operating system that implements automatic object deallocation can frustrate the attempts of old programs developed for operating systems without automatic object deallocation to informally share an object. The timing diagram depicts the consequences of the same series of events in connection with old programs shown in FIG. 2 in an operating system that implements automatic object deallocation. The timing diagram shows a time scale 500 having the following time graduations: time $t_1$, time $t_2$, time $t_3$, time $t_4$, and time $t_5$. The timing diagram also shows a spreadsheet program running intercal 510 during which the spreadsheet program is running, a word processing program running interval 530 during which the word processing program is running, and a bitmap object allocated interval 520 during which the a bitmap object is allocated. The timing diagram further shows an automatic deallocation system running interval 540, which indicates that the portion of the operating system responsible for automatic object deallocation is always running.

A spreadsheet program launch node 511 shows that the spreadsheet program is launched at time $t_1$. The launch stares the spreadsheet program running interval 510. Together a causation arrow 512 and an object allocation node 521 show that the spreadsheet program allocates the bitmap object at time $t_2$. The operating system sets the owner field 302 of the bitmap object to indicate that the spreadsheet program owns the bitmap object because the spreadsheet program allocated the bitmap object. The spreadsheet program uses the bitmap object during object use range 522; from time $t_2$ until the spreadsheet program terminates at time $t_4$. A word processing program launch node 531 shows that the word processing program is launched at time $t_3$. The launch starts the word processing program running interval 530. An object use range 523 shows that the word processing program begins using the bitmap object immediately at time $t_3$. Both objects continue to use, i.e., share, the bitmap object until time $t_4$. A spreadsheet program termination node 513 shows that the spreadsheet program terminates at time $t_4$. Although the spreadsheet program attempts to delegate the responsibility for deallocating the bitmap object to the word processing program, causation arrow 541 shows that the automatic deallocation system deallocates the bitmap object as the spreadsheet program is terminating at $t_4$ because the spreadsheet program is the owner of the bitmap object. An object use range 523 shows that word processing program uses the bitmap object from $t_3$ until the spreadsheet program terminates at $t_4$. An object nonuse range 533 shows that the word processing program is unable to use the bitmap object from $t_4$ until the word processing program terminates at $t_5$. This amounts to a frustrated attempt by the word processing program so share the object during the object nonuse range 533. The same result occurs any time the program that allocated an object terminates before sharing of the object concludes.

FIG. 6 is a timing diagram that illustrates how an operating system that implements object access control can frustrate the attempts of old programs developed for operating systems without object access control to informally share an object. The timing diagram depicts the consequences of the same series of events in connection with old programs shown in FIG. 2 in an operating system that implements object access control. The timing diagram shows a time scale 600 having the following time graduations: time $t_1$, time $t_2$, time $t_{2.5}$, time $t_3$, time $t_4$, and time $t_5$. The timing diagram also shows a spreadsheet program running interval 610 during which the spreadsheet program is running, a word processing program running interval 630 during which the word processing program is running, and a bitmap object allocated interval 620 during which the bitmap object is allocated. The timing diagram further shows an access control system running interval 650, which indicates that the portion of the operating system responsible for object access control is always running.

A spreadsheet program launch node 611 shows that the spreadsheet program is launched at time $t_1$. The launch starts the spreadsheet program running interval 610. Together a causation arrow 612 and an object allocation node 621 show that, at time $t_2$, the spreadsheet program allocates the bitmap object. The operating system sets the owner field 402 of the bitmap object to indicate that the spreadsheet program, because it allocated the bitmap object, owns the bitmap object. Because the old spreadsheet program was not developed with access control in mind, it does not explicitly designate any access control list entries to authorize the use of the object by other programs. The operating system, however, sets The access control list pointer 403 to point to a default access control list designating access authorization only to the object's owner, the spreadsheet program. A causation arrow 651 shows that, at time $t_{2.5}$, the spreadsheet program requests access to the object. The access control system receives the request, and examines the list entries in the access control list 410 to determine if the spreadsheet program is authorized to access the object 400. A causation arrow 652 shows that, because the access control system locates an access list entry authorizing access to the object by the spreadsheet program, the access control system provides the spreadsheet program with access to the object. The spreadsheet program uses the bitmap object during object use range 622, beginning at time $t_{2.5}$. A word processing program launch node 631 shows that the word processing program is launched at time $t_3$. The launch starts the word processing program running interval 630. A causation arrow 653 shows that, at time $t_3$, the word processing program requests access to the object in order to share the object. The access control system receives the request, and examines the list entries in the access control list 410 to determine if the program is authorized to access the object 400. A causation arrow 654 shows that the access control system declines to provide the program with access to the object, because no access control list entry appears in the access control list authorizing access to the object by the word processing program. This amounts to a frustrated attempt by the word processing program to share the object during the object nonuse range 633. The same result occurs any time a program other than the one that allocated an object attempts to access the object.

It can be readily seen from the foregoing examples that programs developed for operating systems that support a laissez faire object ownership model may perform undesirably when used with an operating system that supports a more rigorous object ownership model, such as one that incorporates automatic object deallocation or object access control.

SUMMARY OF THE INVENTION

It is an object of the invention to provide a method and system in a computer system for selectively applying an appropriate object ownership model in an operating system.

It is another object of the invention to provide a method and system in a computer system for accommodating programs designed for use with an operating system that does not apply a rigorous object ownership model in an operating system capable of applying a rigorous object ownership model.

It is a further object of the invention to provide a method and system in a computer system for deferring automatic object deallocation for objects that may be used by programs designed for use with an operating system that does not perform automatic object deallocation.

It is a still further object of the invention to provide a method and system in a computer system for allowing special permissive access to objects owned by programs that are unable to authorize access to the object by other programs.

These and other objects, which will become apparent as the invention is more fully described below, are provided by a method and system for selectively applying an appropriate object ownership model. In a preferred embodiment, an operating system selectively applies an object ownership model with which running programs are compatible. This permits programs designed to be used with operating systems that do not apply a rigorous object ownership model to be used with an operating system capable of applying a rigorous object ownership model. The method and system has both an automatic object deallocation phase and an object access control phase. In the automatic deallocation control phase, the method and system defers the automatic deallocation of objects owned by programs that are incompatible with automatic object deallocation until a later time at which no such programs are still running. Instead of immediately deallocating the objects owned by a terminating program, the method and system designates them for deferred deallocation. At a later time, the method and system checks to see whether any programs that are incompatible with automatic object deallocation are still running, and, if none are, the method and system deallocates all objects designated for deferred deallocation. In the object access control phase, the method and system allows special permissive access to objects owned by programs that are unable to authorize access to the object by other programs. Instead of denying access by a requesting program to an object owned by a program that is unable to authorize access to the object by other programs, the method and system allows the requesting program to access the object.

DETAILED DESCRIPTION OF THE INVENTION

The preferred embodiment of the present invention provides a method and system for ensuring the compatibility of an operating system having a first object ownership model with other programs developed for an operating system having a second, less rigorous object ownership model (old programs). A software compatibility facility detects when the operating system is about to apply its more rigorous object ownership model to an object. If the object is being used by an old program, then the software compatibility facility (the facility) preempts the application of the more rigorous object ownership model to the object, or, if possible, defers the application of the more rigorous object ownership model to the object until the object is no longer being used by an old program. Otherwise, the facility permits the operating system to apply the more rigorous object ownership model to the object. Implementations of the facility are described that ensure the compatibility of operating systems supporting rigorous object ownership models featuring automatic object deallocation or object access control with programs developed for an operating system with a less rigorous object ownership model. The adaptation of the implementations to compound programs that are comprised of two or more smaller subprograms, called modules, is also discussed.

Figure 7:
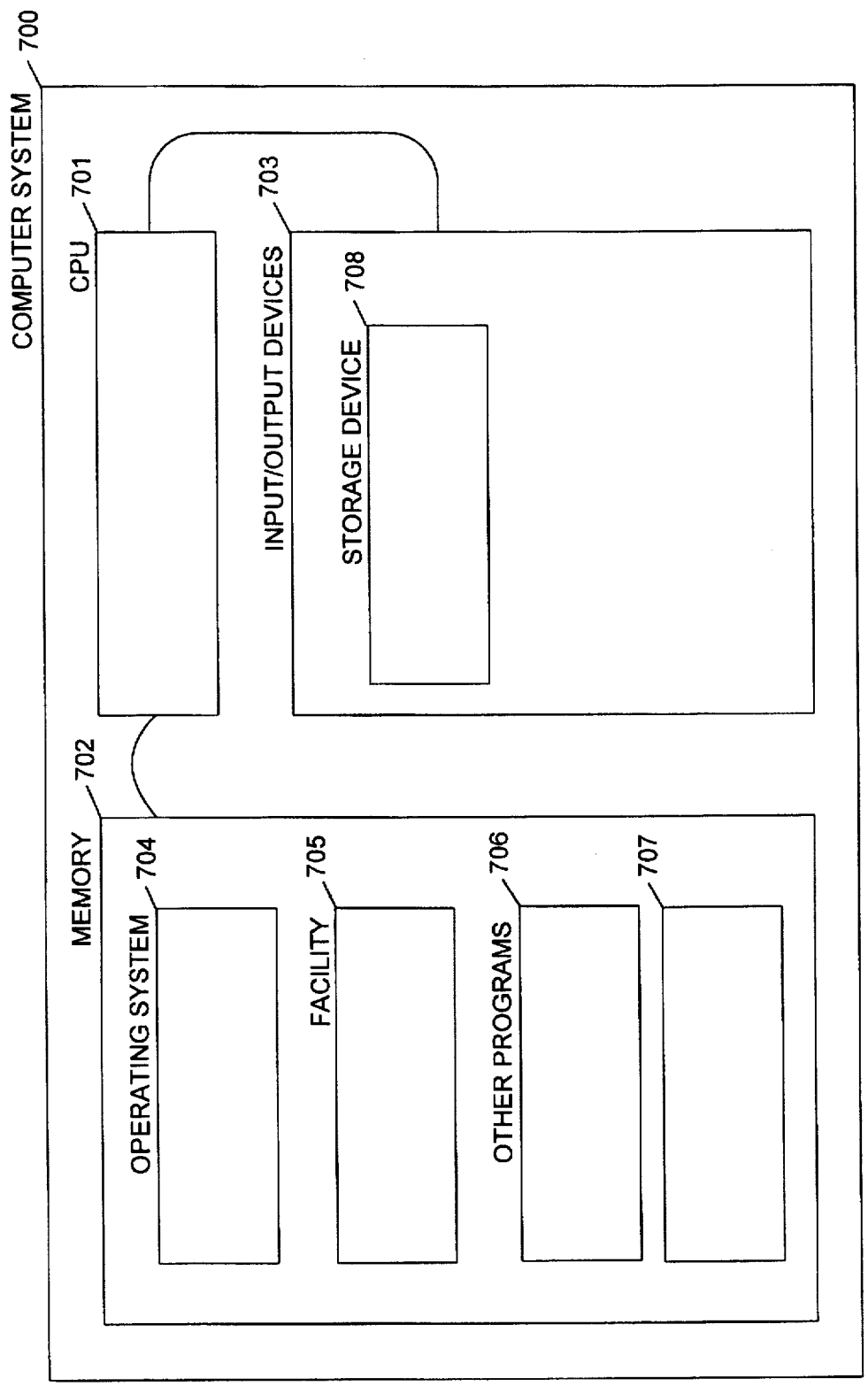
FIG. 7 is a high-level block diagram of the general-purpose computer system upon which the facility preferably operates.

FIG. 7 is a high-level block diagram of a general-purpose computer system (system) upon which the facility preferably operates. The computer system 700 contains a central processing unit (CPU) 701, a computer memory (memory) 702, and input/output devices 703. The memory 702 contains the operating system 704, the facility 705, and other programs 706 and 707. The programs 704-707 stored in the memory 702 execute on the CPU 701. The input/output devices contain a storage device 708, such as a hard disk drive. Programs may also be stored on the storage device 708 and paged into the memory 702 as needed. In a preferred embodiment, the facility is integrated within the operating system. That is, the operating system contains the modified program launching service and program termination service that comprise the facility and that are described below, and the operating system need not be modified to include and use them. Also, in a preferred embodiment, the operating system is an enhanced version of Microsoft Windows that is compatible with Windows 3.0 and Windows 3.1 applications, as well as Windows NT applications.

In a preferred automatic object deallocation implementation, the facility defers automatic object deallocation where necessary to ensure compatibility with old programs. Briefly, the facility defers the deallocation of all objects owned by a terminated old program until no old programs remain running on the system. These objects may then be safely deallocated, as no old program can be dependent on the continued existence of such objects if no old programs are running. (New programs either do not use the objects or have explicitly assumed ownership.)

Figure 8:
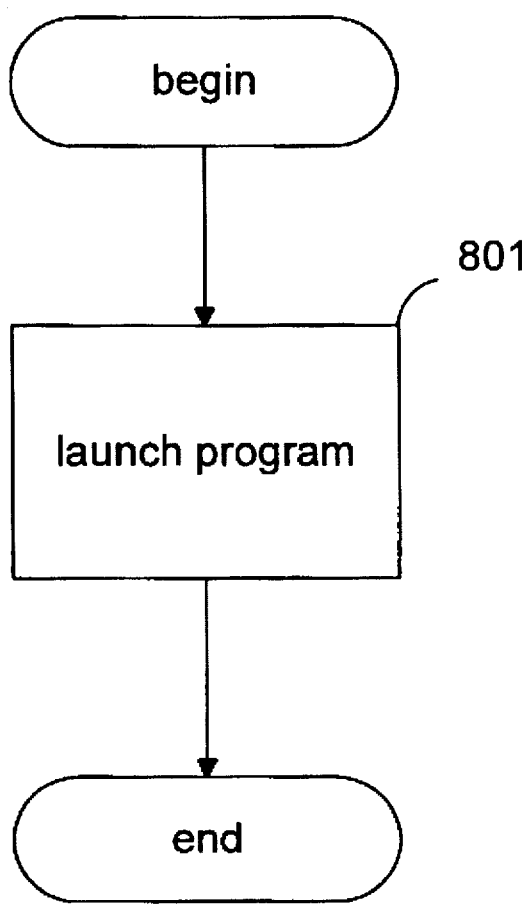
FIG. 8 is a flow diagram of the steps performed by the standard program launching service.
Figure 9:
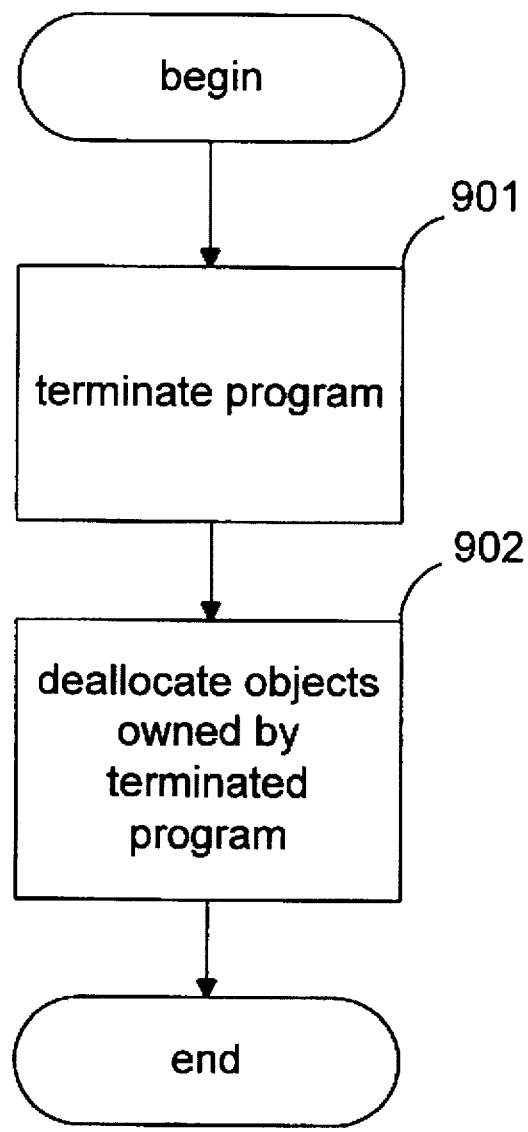
FIG. 9 is a flow diagram of the steps performed by the standard program termination service.

The facility operates in conjunction with an operating system that provides automatic object deallocation. Among others, the operating system provides four standard services that other programs can request: launch a program, allocate an object, change an object owner, and terminate a program. The standard program launching service loads and executes a specified program. FIG. 8 is a flow diagram of the steps performed by the standard program launching service. In step 801, the operating system actually launches the specified program. This usually includes loading the program from the storage device into memory and beginning execution. These steps then conclude. The standard object allocation service allocates memory for an object of a specified type and attributes ownership of the allocated object to the requesting program. The standard service for changing an object's owner redistributes the ownership of a specified object from its present owner to a specified program. Finally, the standard program termination service terminates a specified program, then deallocates any objects whose ownership is attributed to the terminated program. FIG. 9 is a flow diagram of the steps performed by the standard program termination service. In step 901, the operating system actually terminates the specified program. This usually involves removing the terminated program from a list of currently executing programs maintained by the operating system, as well as reclaiming all of the memory allocated to the terminated program. In step 902, the operating system deallocates all the objects owned by the terminated program. This step involves examining all the allocated objects and deleting those allocated objects owned by the terminated program. These steps then conclude.

The facility modifies the program launching and program termination services to deter the automatic deallocation of objects owned by terminated old programs until no old programs remain running. Briefly, when an old program is launched, the modified program launching service increments a counter of running old programs. When an old program terminates, the modified program termination service identifies the objects that are owned by the program, and, instead of deallocating the objects immediately, it designates the objects as formerly owned by an old program. When the counter value indicates that the last old program has terminated, the modified program termination service deallocates each object that is designated as formerly owned by an old program. The modified services are discussed in more detail below in connection with FIGS. 11 and 12.

In order to fully exhibit the functionality of the modified services, they will be discussed with respect to an example in which old programs informally share an object. In the example, a spreadsheet program allocates a toolbar bitmap that it informally shares with a word processing program. These two programs are launched at a time when no other old programs are running.

Figure 1:
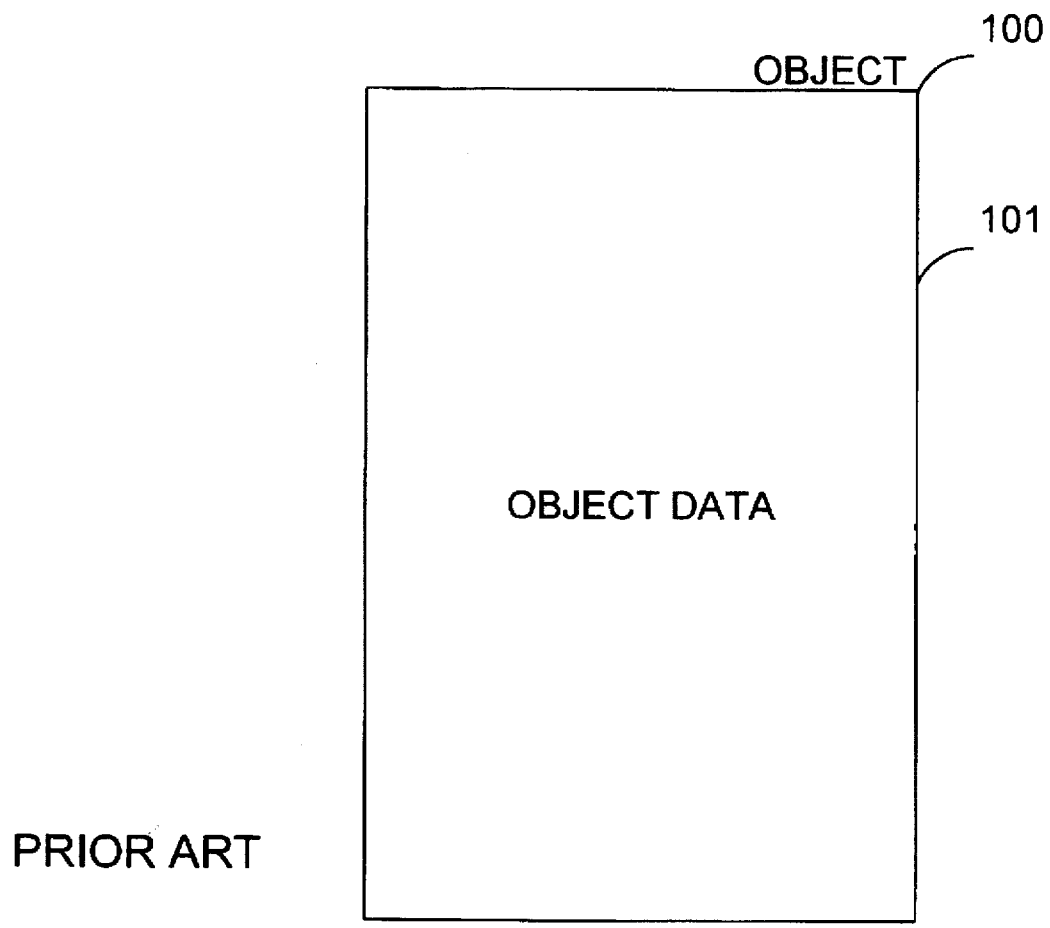
FIG. 1 is a block diagram of an object as defined in an operating system that supports The laissez faire object ownership model.
Figure 2:
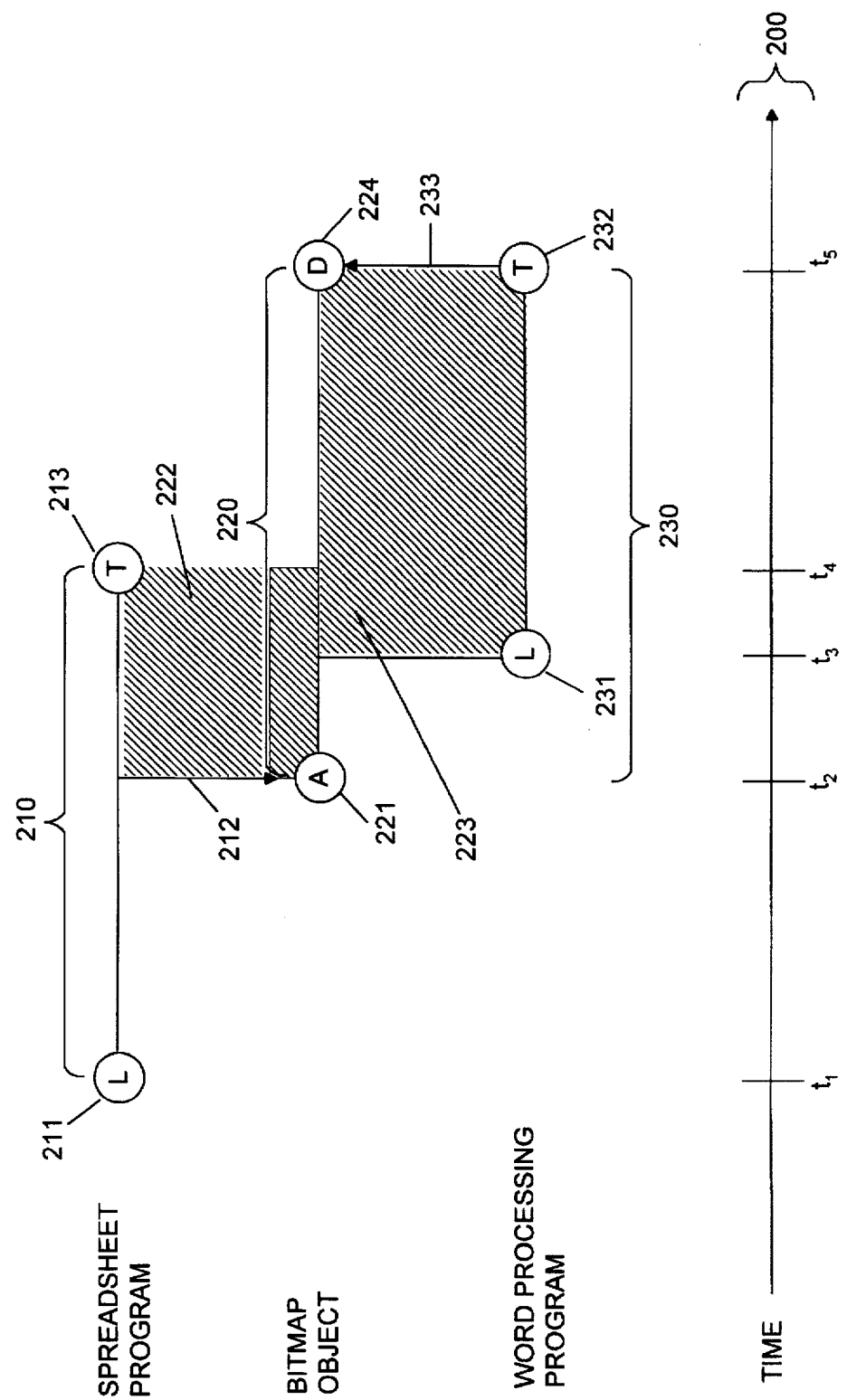
FIG. 2 is a timing diagram showing the informal sharing of a laissez faire object.
Figure 3:
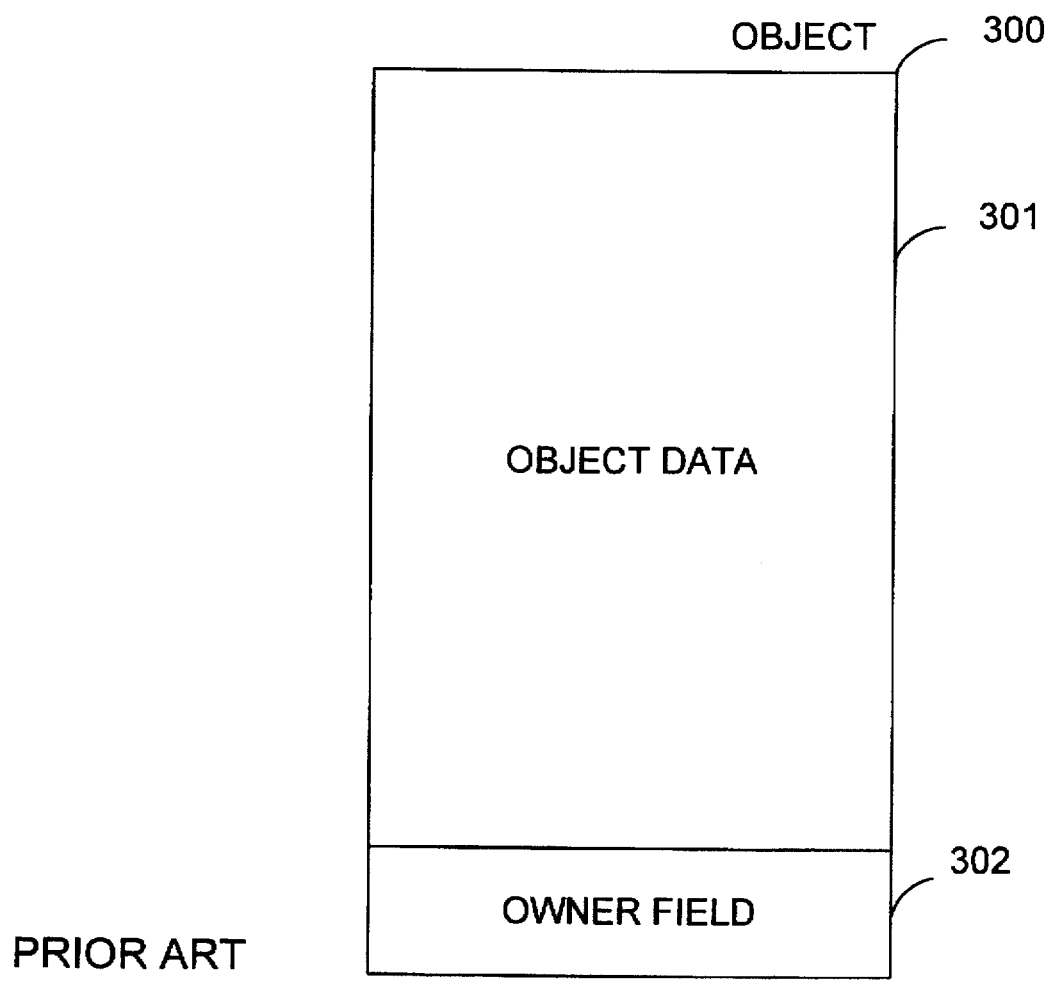
FIG. 3 is a block diagram of an object as defined in an operating system that supports a more rigorous object ownership model.
Figure 4:
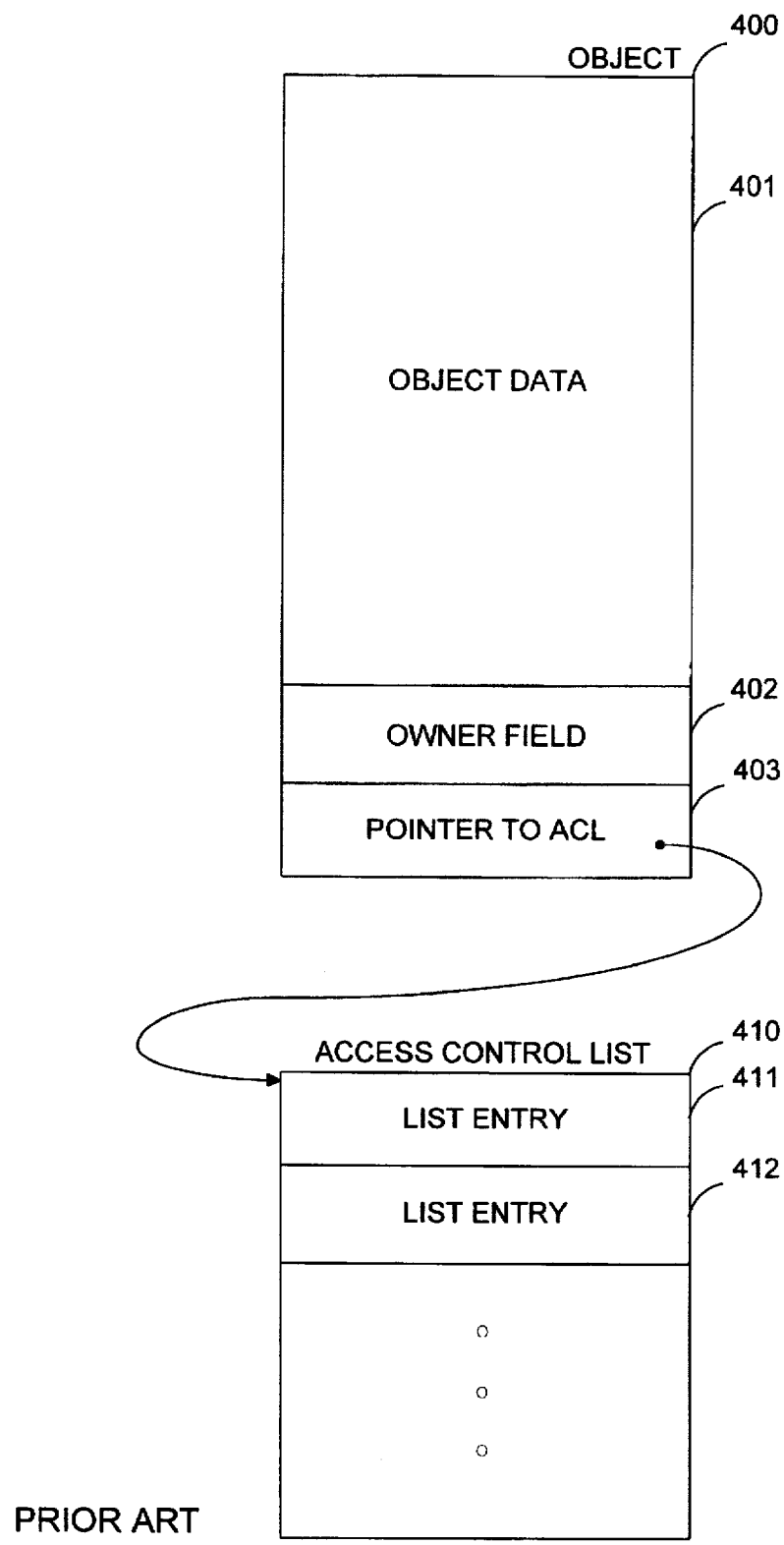
FIG. 4 is a block diagram of an object as defined in an operating system that controls the set of users or programs that may access owned objects.
Figure 10:
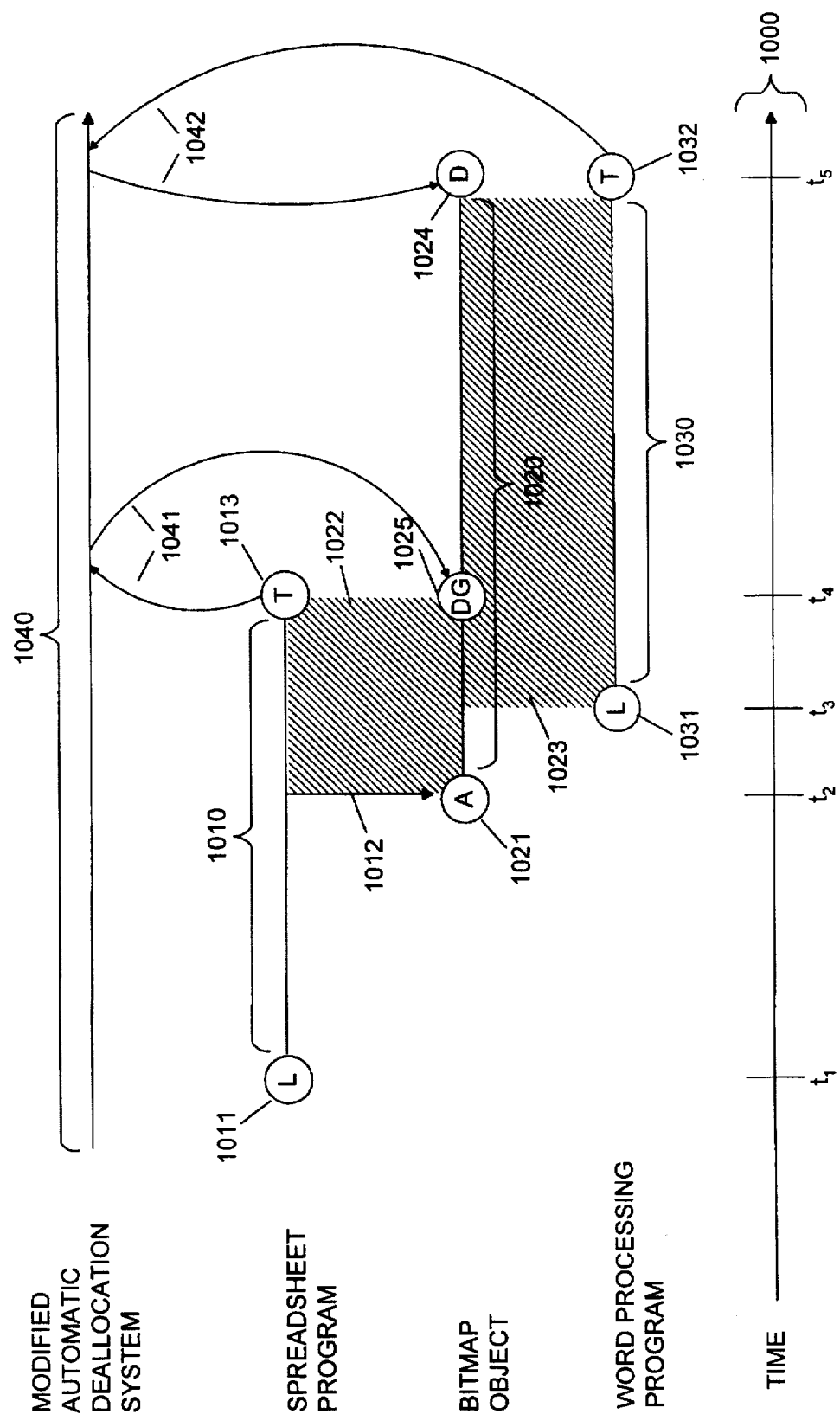
FIG. 10 is a timing diagram that illustrates the informal sharing of an object in an operating system having automatic object deallocation that is running in conjunction with the facility.

FIG. 10 is a timing diagram that illustrates the informal sharing of an object in an operating system having automatic object deallocation that is running in conjunction with the facility. The timing diagram depicts the consequences of the series of events in correction with old programs shown in FIG. 2 in an operating system that implements automatic object deallocation that is running in conjunction with the facility. The timing diagram shows a time scale 1000 having the following time graduations: time $t_1$, time $t_2$, time $t_3$, time $t_4$, and time $t_5$. The timing diagram also shows a spreadsheet program running interval 1010 during which the spreadsheet program is running, a word processing program running interval 1030 during which the word processing program is running, and a bitmap object allocated interval 1020 during which the a bitmap object is allocated. The timing diagram further shows an automatic deallocation system running interval 1040, which indicates that the portion of the operating system responsible for automatic object deallocation into which the facility is incorporated is always running.

Figure 11:
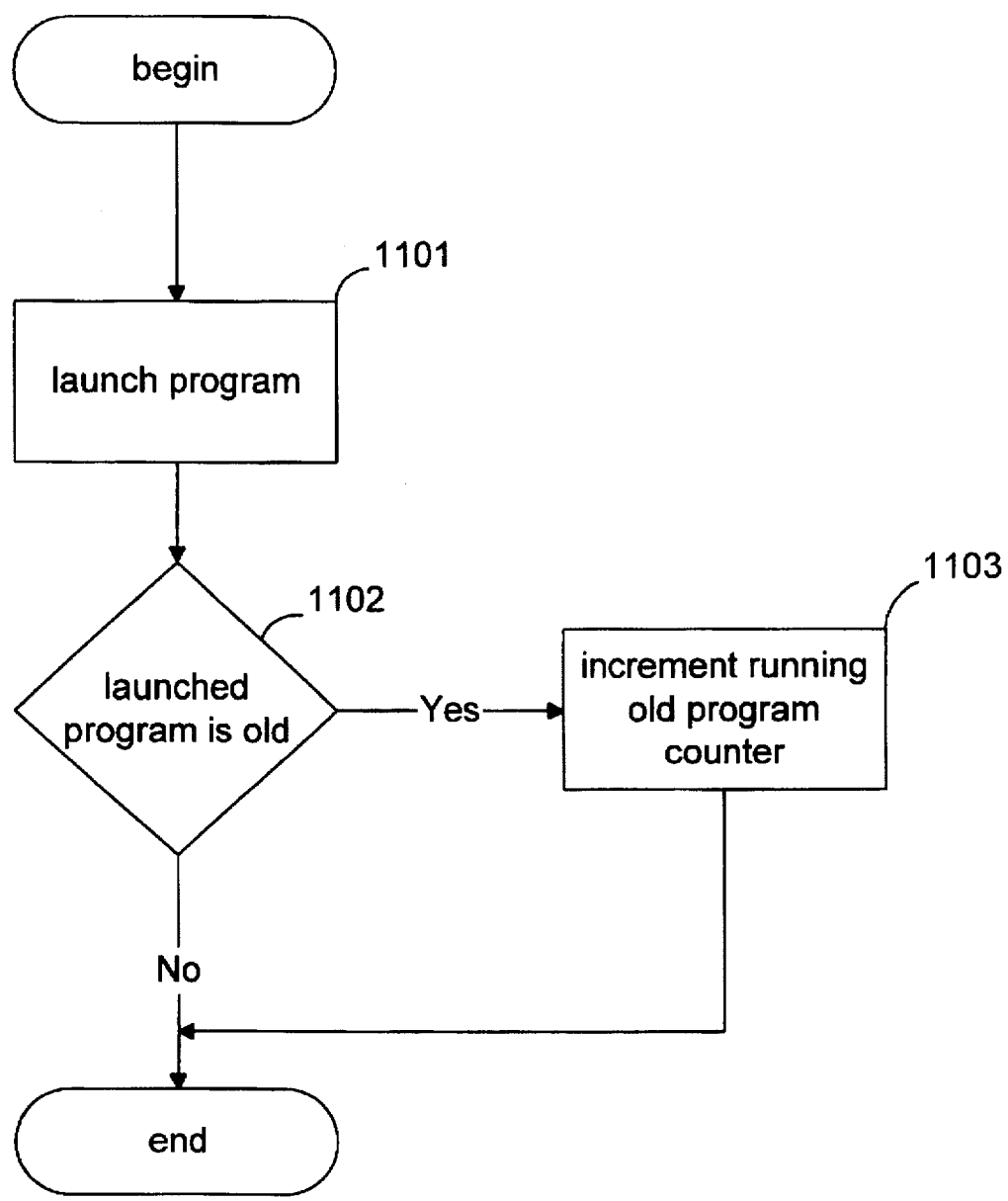
FIG. 11 is a flow diagram of the steps performed by the modified program launching service.

In order to load and start execution of the spreadsheet program, a program submits a request to the program launching service to launch the spreadsheet program. In many computer systems, the requesting program is a program manager program designed to launch other programs in response to user commands. A spreadsheet launch node 1011 shows that a request to launch the spreadsheet program is made at time $t_1$. FIG. 11 is a flow diagram of the steps performed by the modified program launching service. FIG. 11 may be compared to FIG. 8 to discern the modifications to the program launching service of the operating system that are necessary to implement the facility. Briefly, in addition to actually launching the program, if the launched program is an old program, the modified program launching service implements the old program counter. In step 1101, the facility performs the operations required to actually launch the spreadsheet program, i.e., loading the program and beginning its execution. In step 1102, if the launched program is an old program, then the facility in step 1103 increments a counter of the number of old programs presently running, i.e., launched and not terminated (the running old program counter). The facility determines whether the launched program is an old program by checking a field in the header of the launched program set by the compiler used to compile the old program to indicate the version of the operating system for which the program was compiled. Since the spreadsheet program is an old program, the facility increments the running old program counter from zero to one. These steps then conclude.

After the spreadsheet program is launched, it requests the object allocation service to allocate a bitmap object. The object allocation service allocates a bitmap object at time $t_2$, as shown by a causation arrow 1012 and an object allocation node 1021. The object allocation service further attributes ownership of the object to the spreadsheet program by setting the owner field 302 of the bitmap object to indicate that the spreadsheet program owns the bitmap object. The object allocation service returns access information, such as a pointer, to the spreadsheet program that allows the spreadsheet program to access the bitmap object. The spreadsheet program proceeds to use the bitmap object during an object use range 1022, from time $t_2$ until the spreadsheet program terminates at time $t_4$, accessing the bitmap object using the access information.

At time $t_3$, the program launching service is requested to launch the word processing program as shown by a word processing program launch node 1031, and the running old program counter is incremented again, from one to two. The launch starts the word processing program running interval 1030. After the word processing program is launched, the word processing program and the spreadsheet program communicate to negotiate the informal sharing of the bitmap object. As part of the negotiation process, the spreadsheet program passes a copy of the access information for the bitmap object to the word processing program to permit the word processing object to use the object. An object use range 1023 shows that the word processing program begins using the bitmap object immediately at time $t_3$. Both objects continue to use, i.e., share, the bitmap object until time $t_4$.

When the spreadsheet program is ready to terminate immediately before time $t_4$, it notifies the word processing program that the word processing program now has deallocation responsibility for the bitmap object. However, because the spreadsheet program is an old program and was developed for an operating system that had neither a notion of object ownership nor the service for changing an object's owner, the spreadsheet does not request the service for changing an object's owner to redistribute ownership of the bitmap object to the word processing program. A spreadsheet program termination node 1013 shows that the spreadsheet program then requests the program termination service in order to terminate the spreadsheet program at time $t_4$.

Figure 12:
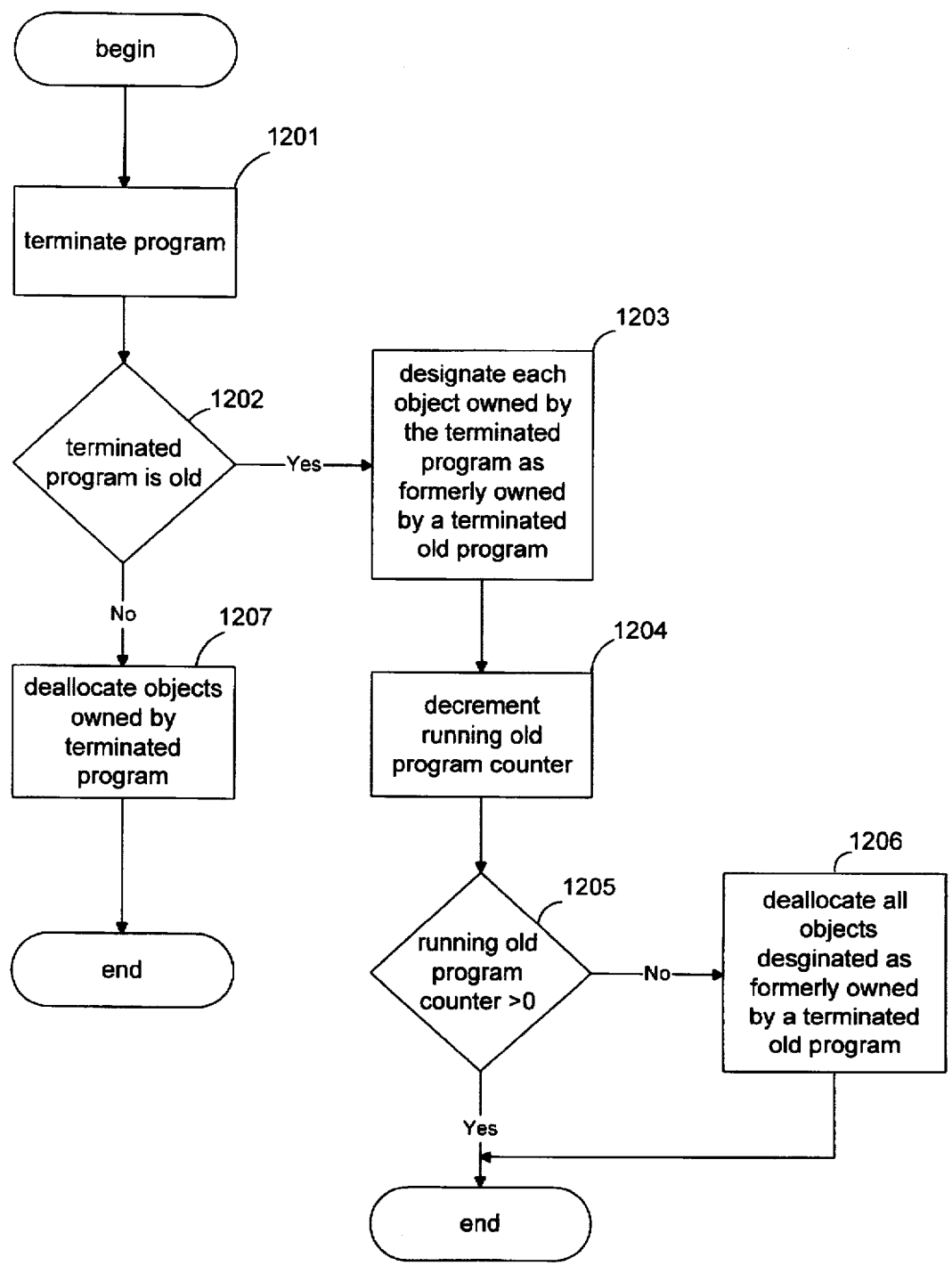
FIG. 12 is a flow diagram of the steps performed by the modified program termination service.

FIG. 12 is a flow diagram of the steps performed by the modified program termination service. FIG. 12 may be compared to FIG. 9 to discern the modifications to the program termination service of the operating system necessary to implement the facility. Briefly, when the terminated program is an old program, the modified program termination service designates the objects owned by the terminated program as owned by a terminated old program and only deallocates these objects, along with others so designated, if no other old programs remain active. In step 1201, the facility performs the operations required to actually terminate the spreadsheet program, freeing the memory in which the spreadsheet program is stored. In step 1202, if the terminated program is an old program, then the facility continues at step 1203, else the facility continues at step 1207 to deallocate each object owned by the terminated program. Since the spreadsheet program is an old program, the facility continues at step 1203. In step 1203, the facility designates each object owned by the terminated program as formerly owned by a terminated old program. This step involves traversing the linked lists that connect allocated objects to locate any objects appearing in the linked lists whose owner fields 302 indicates that they are owned by the terminated program, and either making the designation for each object within the object itself, or within a central object management data structure. The completion of step 1203 is shown by an object designation node 1025. In step 1204, the facility decrements the running old program counter from two to one. In step 1205, if the running old program counter is greater than zero, then these steps conclude, else it is safe to deallocate all of the designated objects and the facility continues at step 1206. In step 1206, the facility deallocates all of the objects designated as formerly owned by a terminated old program. This step involves searching the object linked list or the central object management data structure for designated objects and deallocating them. These steps then conclude. Since the running old program counter is now equal to one, it is greater than zero. Step 1206 is therefore not executed, and the deallocation of the bitmap object is deferred, as shown by causation arrow 1041. This permits the word processing program to continue using the bitmap object.

Figure 5:
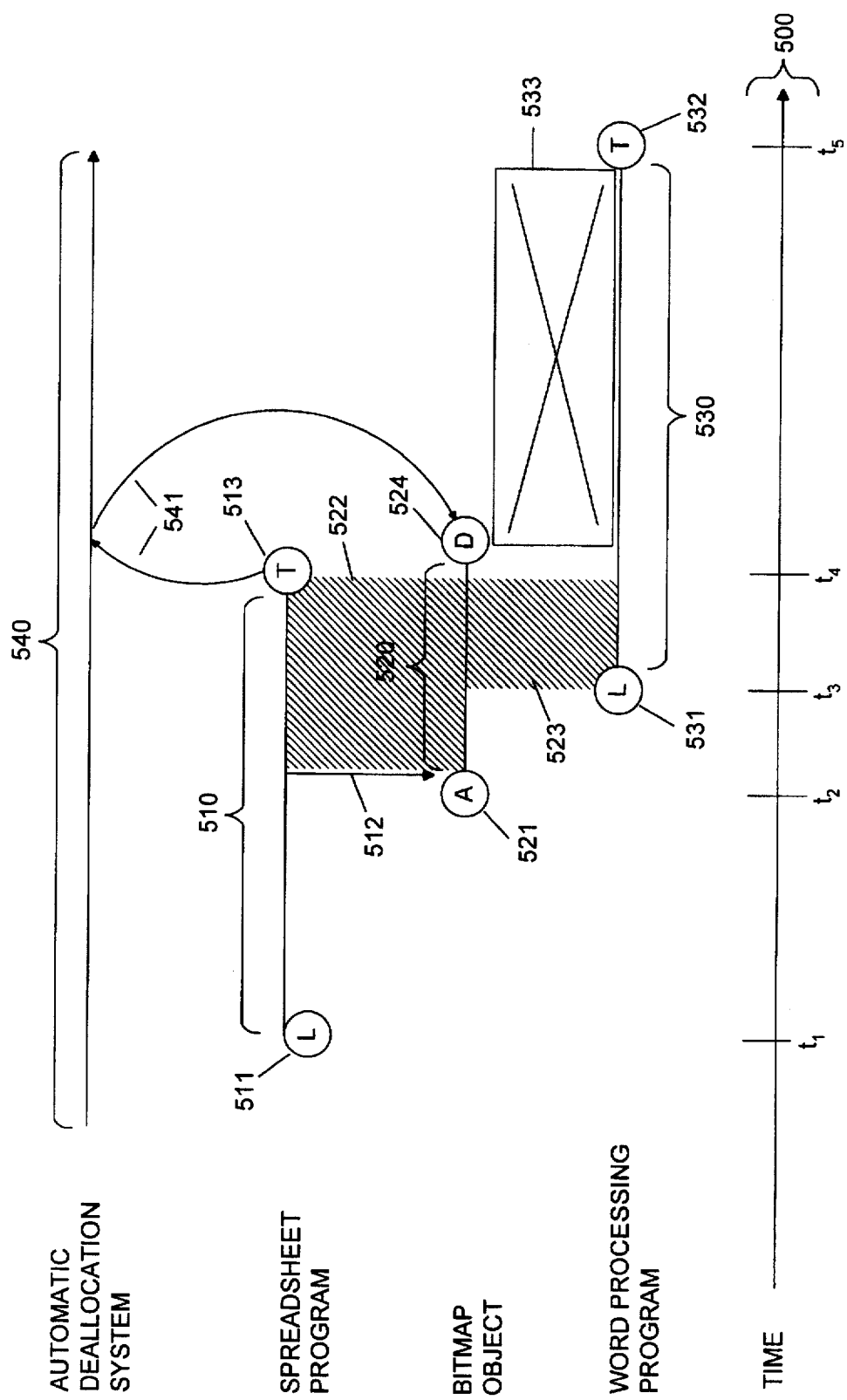
FIG. 5 is a timing diagram that illustrates how a new operating system that implements automatic object deallocation can frustrate the attempts of old programs developed for operating systems without automatic object deallocation to informally share an object.
Figure 6:
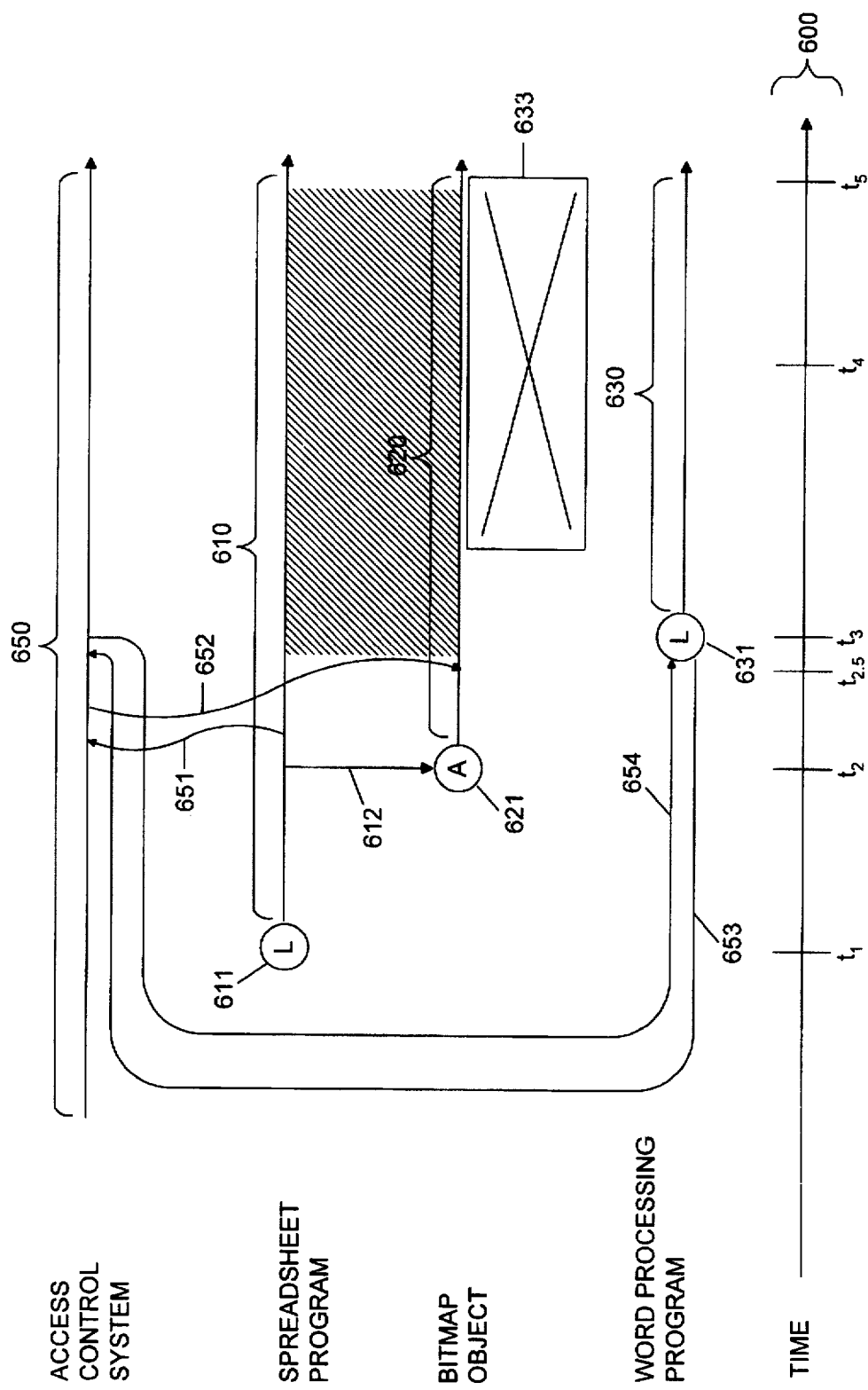
FIG. 6 is a timing diagram that illustrates how a new operating system that implements object access control can frustrate the attempts of old programs developed for operating systems without object access control to informally share an object.

A word processing program termination node 1032 shows that the word processing program requests the program termination service to terminate the word processing program at time t₅. The program termination service decrements the running old program counter from one to zero. Since the bitmap object has been marked "formerly allocated by old program," step 1203 will not modify field 302 of the bitmap object. Since the running old program counter is now zero, it is no longer greater than zero. Step 1206 is therefore executed, and the facility deallocates the bitmap object, which is designated as formerly owned by a terminated old program. The completion of step 1206 is shown by a bitmap object deallocation node 1024. An object use range 1023 shows that word processing program is able to use the bitmap object from t₃ until the word processing program terminates at t₅, solving the problem illustrated in FIG. 5 in which the automatic deallocation system deallocated the bitmap object before the word processing program that was sharing the bitmap object finished using the bitmap object.

In alternative embodiments, the facility uses different methods for determining when designated objects may be safely deallocated. For example, in a distributed processing system comprised of several connected computer systems, instead of maintaining a running old program counter for each computer system in distributed processing system, the facility preferably maintains a single running old program counter for the entire distributed processing system. The facility deallocates designated object only when the single running old program counter reaches zero. As another example, on a multi-user computer system that may be used by several users at once, the facility preferably maintains a running old program counter for each user, and when designating an object as formerly owned by a terminated old program, also designates the user that launched the terminated old program. When the running old program counter for a particular user reaches zero, the facility preferably deallocates the objects designated as formerly owned by a terminated old program that was launched by the user. A multiple running old program counter approach may be applied for program groups of any nature, such as groups of particular types of programs. Other variations are also possible, including deallocating designated objects if no running old program has ever accessed a designated object, or if a specified period of time has passed since a running old program last accessed a designated object.

Some operating systems support compound programs. A compound program is a program comprised of two or more smaller subprograms, called modules. Compound programs facilitate the reuse of existing code by permitting an existing module to be used by a new compound program. Some modules are formally shareable, which allows a single copy of them to be used by multiple compound programs simultaneously. Operating systems that support compound programs often oversee them by creating an administrative task (task) for each running compound program to maintain status information about each of the modules of the compound program. The entirety of a compound program may then be terminated by terminating the compound program's task. Some operating systems that support compound programs and object ownership apply object ownership at the task level, initially attributing the ownership of an object to the task that oversees the module that allocated it. Such operating systems usually also permit ownership to be reattributed to either a module or another task.

Figure 13:
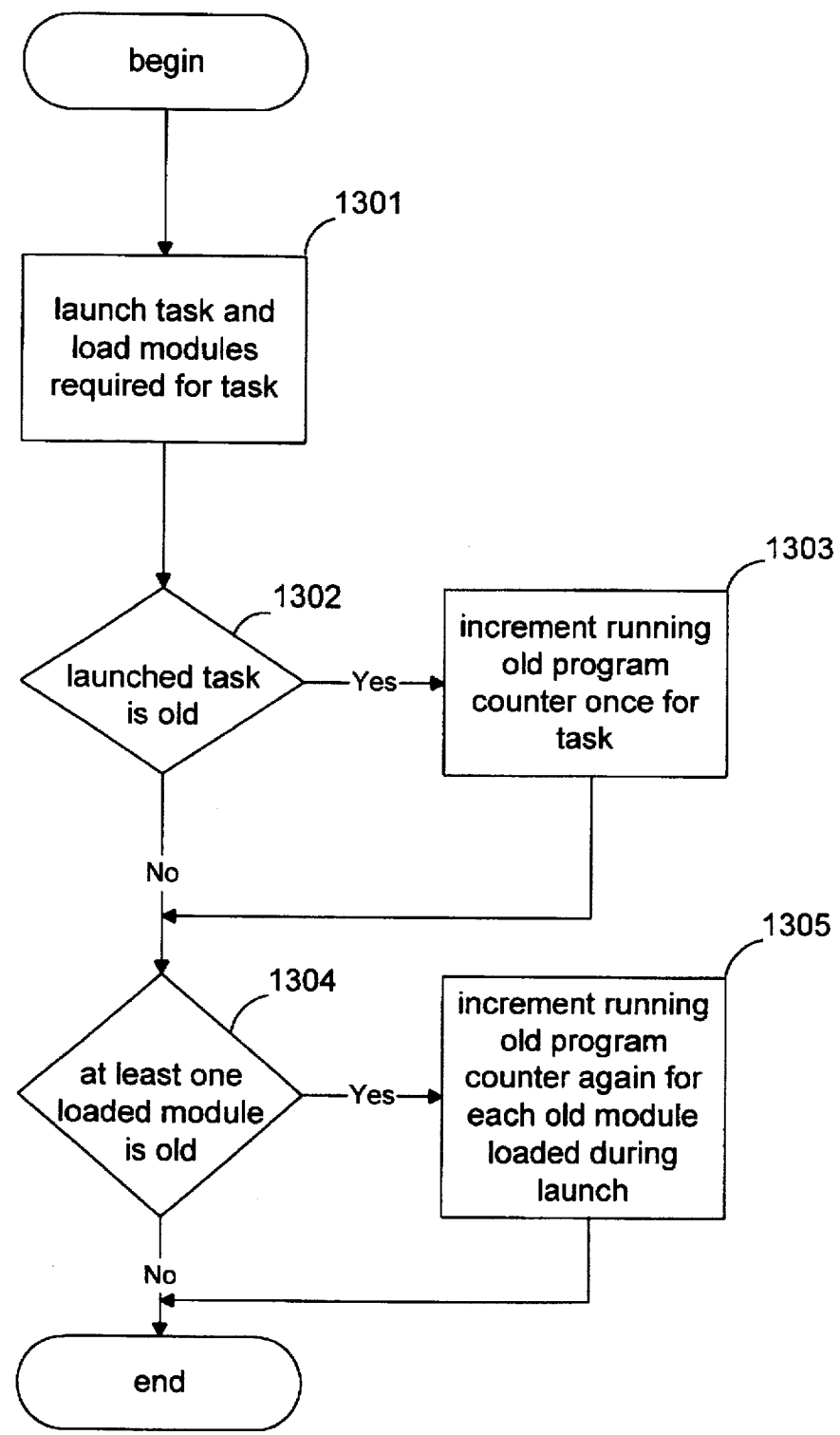
FIG. 13 is a flow diagram of the steps performed by the modified program launching service for tasks.

When the facility is used in conjunction with an operating system that supports compound programs, ownership of objects allocated by a new module is preferably assigned to the allocating module's task. On the other hand, ownership of objects allocated by an old module is preferably assigned to the allocating module instead of the allocating module's task. Assigning the ownership of objects allocated by old modules requires modifying this aspect of the object allocation service. Further, the program launching service and the program termination service preferably treat each module and each task as a separate program. The program launching service preferably increments the running old program count for each old task or old module launched. FIG. 13 is a flow diagram of the steps performed by the modified program launching service for tusks. FIG. 13 may be compared to FIG. 11 to discern the modifications to the modified program launching service for programs that are necessary to implement the modified program launching service for tasks. Briefly, the modified program launching service for tasks has additional steps that increment the old program counter for each module floated during the launch of a task. In step 1301, the facility performs the operations required to actually launch the specified program, i.e., loading the program and beginning its execution. In step 1302, if the launched task is an old task, then the facility in step 1303 increments the running old program counter. In step 1304, if at least one of the modules loaded for the task in step 1301 is an old module, then the facility in step 1305 increments the running old program counter once for each old module loaded in step 1301, else these steps conclude. These steps then conclude.

Also, when the program termination service is called for the task of a compound program, the program termination service preferably requests itself to terminate each of the modules of the compound program. If another compound program is using a given formally shareable module of the compound program whose task is being terminated, the termination of the module is aborted. If no other compound program is using the module and it is not an old module, then all of the objects owned by the module are immediately deallocated. If no other compound program is using the module and it is an old module, then all of the objects owned by the module are designated as formerly owned by an old program and not immediately deallocated.

Figure 14:
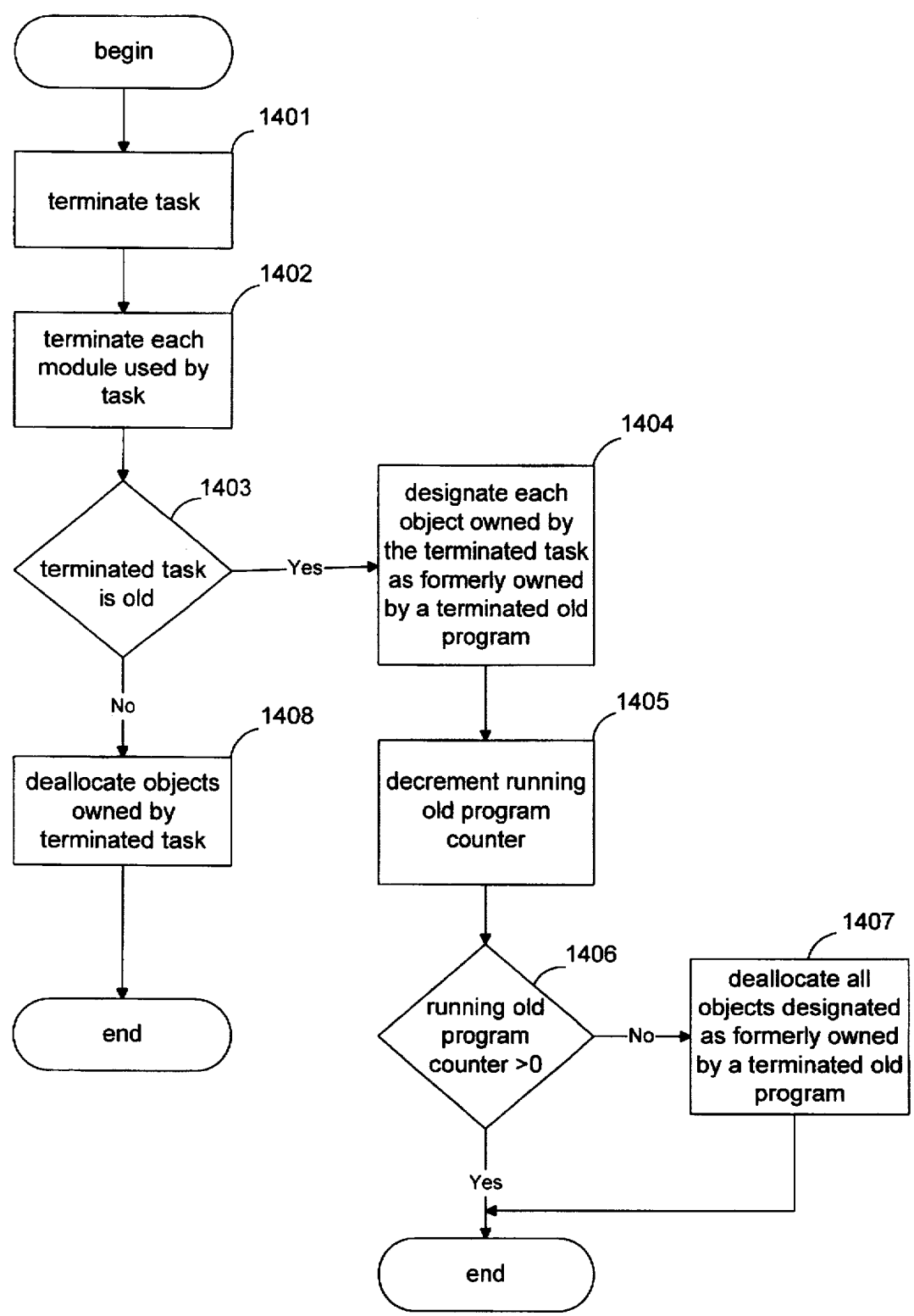
FIG. 14 is a flow diagram of the steps performed by the modified program termination service for tasks.

FIG. 14 is a flow diagram of the steps performed by the modified program termination service for tasks. FIG. 14 may be compared to FIG. 12 to discern the modifications to the program termination service for programs necessary to implement the program termination service for tasks. Briefly, the program termination service for tasks adds a step in which it individually terminates each module loaded for use by the terminated task. In step 1401, the facility performs the operations required to actually terminate the task, freeing the memory in which the task is stored. In step 1402, the facility terminates each module loaded for use by the task. Further detail on step 1402 is discussed below in conjunction with FIG. 15. In step 1403, if the terminated task is in the old task, then the facility continues at step 1404, else the facility continues at step 1408 to deallocate each object owned by the terminated program. In step 1404, the facility designates each object owned by the terminated task as formerly owned by a terminated old program. In step 1405, the facility decrements the running old program counter. In step 1406, if the running old program counter is greater than zero, then these steps conclude, else it is safe to deallocate all of the designated objects and the facility continues at step 1407. In step 1407, the facility deallocates all of the objects designated as formerly owned by a terminated old program. This step involves searching the object linked list or the central object management data structure for designated objects and deallocating them. These steps then conclude.

Figure 15:
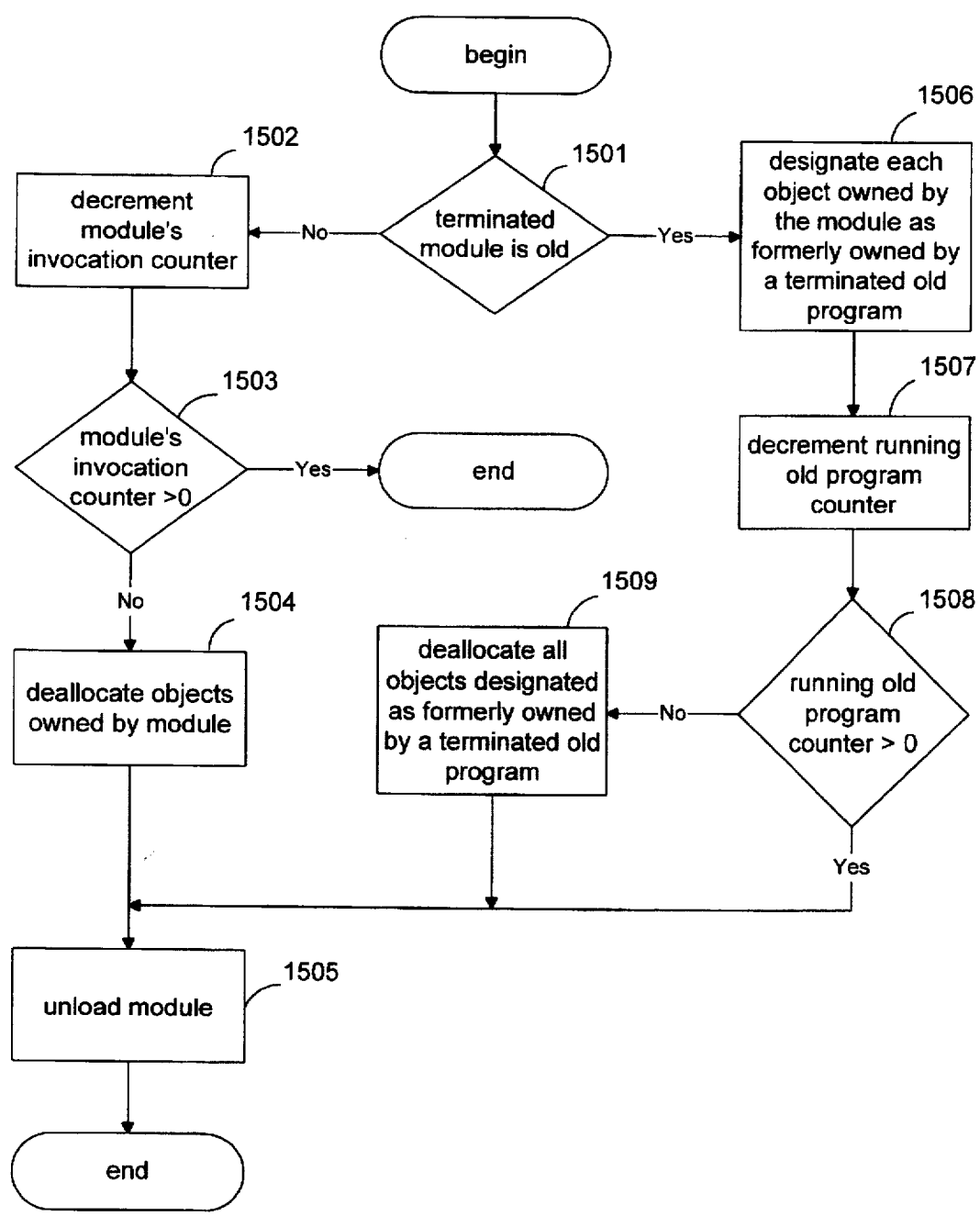
FIG. 15 is a How diagram of the steps performed by the modified program termination service for modules.

FIG. 15 is a flow diagram of the steps performed by the modified program termination service for modules. FIG. 15 may be compared to FIG. 14 to discern the modifications to the modified program termination service for tasks necessary to implement the modified program termination service for modules. Briefly, the modified program termination service for modules contains additional steps for managing the formally shareable aspect of new modules. That is, new modules may be formally shared by new tasks. When a module is loaded for a task, if the module has already been loaded for another task, the module is not reloaded for the present task. In either case, an invocation counter reflecting the number of tasks presently using the module is incremented to show that the present task is using the module. When a module is later terminated in conjunction with a task, the invocation counter is decremented, then checked. If the invocation counter, after being decremented, still indicates that tasks are using the module, the module is not unloaded, and the objects owned by it are not deallocated.

Steps 1501 through 1509 are executed for each module loaded for the task. In step 1501, if the terminated module is an old module, then the facility continues at step 1506, else the facility continues at step 1502. In step 1502, the facility decrements the invocation counter associated with the terminated module. In step 1503, if the invocation counter associated with the terminated module is greater than zero, then other tasks are still using the module and these steps conclude, else the facility continues at step 1504 to deallocate all of the objects owned by the module. Then, in step 1505, the facility unloads the module, freeing the memory occupied by it. These steps then conclude.

In step 1506, the facility, designates each object owned by the module as formerly owned by a terminated old program. In step 1507, the facility decrements the running old program counter. In step 1508, if the running old program counter is greater than zero, then the facility continues at step 1505 to unload the module, else the facility continues at step 1509 to deallocate all of the objects designated as formerly owned by a terminated old program. After step 1509, the facility continues at step 1505 to unload the module. These steps then conclude.

Accessing an object includes reading the object, writing to the object, or invoking a method of the object. In operating systems that support object access control, the program to which ownership of the object is attributed may specify an authorized group of programs that the operating system is to allow to access to the allocated object. An object access service of the operating system then verifies that each program that requests access to a particular object is authorized to access the object. Since old programs do not anticipate access control or the steps required to specify an access control list, the implementation of the facility preferably modifies the object access service to permit any program to access objects owned by old programs. When an object is allocated by an old program, the facility initializes the object's access control list to a default configuration, e.g., full access for all old programs and read-only access for new programs in the system. In an alternate embodiment, the security manager detects that this is an object owned by an old program and assumes that all programs have full access to the object. In this embodiment, no special access control needs to be initialized.

While this invention has been shown and described with reference to preferred embodiments, it will be understood by those skilled in the art that various changes or modifications in form and detail may be made without departing from the scope of the invention. For example, the facility could be implemented in conjunction with a memory allocation and deallocation mechanism not contained in an operating system.

We claim:

1. A method in a first computer operating system that provides services to programs for disabling with respect to programs developed for a second operating system a feature of the first operating system that is incompatible with programs developed for the second operating system, the method comprising the steps of:

when a service is being provided to a program, determining whether the program to which the service is being provided is a program developed for the second operating system;

if the service is not being provided to a program developed for the second operating system, providing the service with the feature intact; and if the service is being provided to a program developed for the second operating system, disabling the feature that is incompatible with programs developed for the second operating system while providing the service, wherein the program may allocate objects and request termination, and wherein the step of providing the service with the feature intact includes the step of immediately deallocating one or more objects allocated by a program requesting termination, and wherein the step of disabling the feature that is incompatible with programs developed for the second operating system while providing the service includes the step of deallocating at a later time one or more objects allocated by the program requesting termination.

2. A method in a first computer operating system that provides service to programs for disabling with respect to programs developed for a second operating system a feature of the first operating system that is incompatible with programs developed for the second operating system, the method comprising the steps of:

when a service is being provided to a program, determining whether the program to which the service is being provided is a program developed for the second operating system;

if the service is not being provided to a program developed for the second operating system, providing the service with the feature intact; and if the service is being provided to a program developed for the second operating system, disabling the feature that is incompatible with programs developed for the second operating system while providing the service, wherein the program may allocate objects and request access to objects and wherein the step of providing the service with the feature intact includes the step of, when a program requests access to an object that the program did not allocate, denying access to the object, and wherein the step of disabling the feature that is incompatible with programs developed for the second operating system while providing the service includes the step of, when the program requests access to an object that the program did not allocate, providing access to the object.

3. A method in a first computer operating system that provides services to programs for disabling with respect to programs developed for a second operating system a feature of the first operating system that is incompatible with programs developed for the second operating system, the method comprising the steps of:

when a service is being provided to a program, determining whether the program to which the service is being provided is a program developed for the second operating system;

if the system is not being provided to a program developed for the second operating system, providing the service with the feature intact; and if the service is being provided to a program developed for the second operating system, disabling the feature that is incompatible with programs developed for the second operating system while providing the service, wherein the program may allocate resources and request access to resources and wherein the step of providing the service with the feature intact includes the step of, when the program requests access to a resource that the program did not allocate, denying the program access to the resource, and wherein the step of disabling the feature that is incompatible with programs developed for the second operating system while providing the service includes the step of, when a program requests access to an resource that the program did not allocate, providing the program with access to the resource.

4. A computer-readable medium whose contents cause a computer system having a first computer operating system that provides services to programs to disable with respect to programs developed for a second operating system a feature of the first operating system that is incompatible with programs developed for the second operating system by performing the steps of:

when a service is being provided to a program, determining whether the program to which the service is being provided is a program developed for the second operating system;

if the service is not being provided to a program developed for the second operating system, providing the service with the feature intact; and if the service is being provided to a program developed for the second operating system, disabling the feature that is incompatible with programs developed for the second operating system while providing the service, wherein the program may allocate objects and request termination, and wherein the step of providing the service with the feature intact includes the step of immediately deallocating one or more objects allocated by a program requesting termination, and wherein the step of disabling the feature that is incompatible with programs developed for the second operating system while providing the service includes the step of deallocating at a later time one or more objects allocated by an existing program requesting termination.

5. A computer-readable medium whose contents cause a computer system having a first computer operating system that provides services to programs to disable with respect to programs developed for a second operating system a feature of the first operating system that is incompatible with programs developed for the second operating system by performing the steps of:

when a service is being provided to a program, determining whether the program to which the service is being provided is a program developed for the second operating system;

if the service is not being provided to a program developed for the second operating system, providing the service with the feature intact; and if the service is being provided to a program developed for the second operating system, disabling the feature that is incompatible with programs developed for the second operating system while providing the service, wherein the program may allocate objects and request access to objects and wherein the step of providing the service with the feature intact includes the step of, when the program requests access to an object that the program did not allocate, denying access to the object, and wherein the step of disabling the feature that is incompatible with programs developed for the second operating system while providing the service includes the step of, when a program requests access to an object that the program did not allocate, providing access to the object.

6. A computer-readable medium whose contents cause a computer system having a first computer operating system that provides services to programs to disable with respect to programs developed for a second operating system a feature of the first operating system that is incompatible with programs developed for the second operating system by performing the steps of:

when a service is being provided to a program, determining whether the program to which the service is being provided is a program developed for the second operating system;

if the service is not being provided to a program developed for the second operating system, providing the service with the feature intact; and if the service is being provided to a program developed for the second operating system, disabling the feature is incompatible with programs developed for the second operating system while providing the service, wherein programs may allocate resources and request access to resources and wherein the step of providing the service with the feature intact includes the step of, when the program requests access to a resource that the program did not allocate, denying access to the resource, and wherein the step of disabling the feature the is incompatible with programs developed for the second operating system while providing the service includes the step of, when a program requests access to an resource that the program did not allocate, providing access to the resource.

7. A method in a computer system upon which programs of a first type and programs of a second type may execute for reclaiming memory occupied by unused objects allocated by programs of the first and second types, the method comprising the steps of:

each time a program of the first type is started, incrementing a counter that counts the number of running programs of the first type;

each time a program of the second type is terminated, deallocating each object allocated by the terminated program of the second type;

each time a program of the first type is terminated:
      designating each object allocated by the terminated program of the first type as allocated by a terminated program of the first type, and
      decrementing the counter; and when the counter reaches zero, deallocating each object designated as allocated by a terminated program of the first type.

8. A computer-readable medium whose contents cause a computer system, upon which programs of a first type and programs of a second type may execute to reclaim memory occupied by unused objects allocated by programs of the first and second type by performing the steps of:

each time a program of the first type is started, incrementing a counter that counts the number of running programs of the first type;

each time a program of the second type is terminated, deallocating each object allocated by the terminated program of the second type;

each time a program of the first type is terminated:
      designating each object allocated by the terminated program of the first type as allocated by a terminated program of the first type, and
      decrementing the counter; and when the counter reaches zero, deallocating each object designated as allocated by a terminated program of the first type.

9. The method of claim 1 wherein the step of deallocating at a later time one or more objects allocated by the program requesting termination comprises the step of deallocating the objects allocated by the program requesting termination when no programs developed for the second operating system are executing.

10. The computer-readable medium of claim 4 wherein the step of deallocating at a later time one or more objects allocated by the program requesting termination comprises the step of deallocating the objects allocated by the program requesting termination when no programs developed for the second operating system are executing.

11. A method in a first computer operating system that provides services to programs for disabling with respect to programs developed for a second operating system an object ownership model of the first operating system that is incompatible with programs developed for the second operating system, the method comprising the steps of:

when a service is requested by an executing program, determining whether the program by which the service is being requested is a program developed for the second operating system;

if the service is not being requested by a program developed for the second operating system, providing the service with the object ownership model intact; and if the service is being requested by a program developed for the second operating system, disabling the object ownership model that is incompatible with programs developed for the second operating system while providing the service.

12. A computer-readable medium whose contents cause a first computer operating system executing on a computer system that provides services to programs for disabling with respect to programs developed for a second operating system and object ownership model of the first operating system that is incompatible with the programs developed for the second operating system by performing the steps of when a service is requested by an executing program, determining whether the program by which the service is being requested is a program developed for the second operating system;

if the service is not being requested by a program developed for the second operating system, providing the service with the object ownership model intact; and if the service is being requested by a program developed for the second operating system, disabling the object ownership model that is incompatible with programs developed for the second operating system while providing the service.

* * * * *